US006182913B1

(12) United States Patent
Howe et al.

(10) Patent No.: US 6,182,913 B1
(45) Date of Patent: Feb. 6, 2001

(54) METHOD AND APPARATUS FOR RECLAIMING CARPET COMPONENTS

(75) Inventors: Michael A. Howe, Rockmart; Samuel H. White, Cedartown, both of GA (US); Samuel G. Locklear, Centre, AL (US)

(73) Assignee: Interface, Inc., LaGrange, GA (US)

( * ) Notice: Under 35 U.S.C. 154(b), the term of this patent shall be extended for 0 days.

(21) Appl. No.: 09/236,878

(22) Filed: Jan. 25, 1999

(51) Int. Cl.$^7$ .................................................. B02C 19/12
(52) U.S. Cl. ............................ 241/1; 241/15; 241/20; 241/24.11; 241/24.12; 241/41; 241/65
(58) Field of Search ........................ 241/1, 24.1, 24.12, 241/41, 65, 79.1, DIG. 38, 15, 20, 24.11

(56) References Cited

U.S. PATENT DOCUMENTS

| | | |
|---|---|---|
| 1,484,208 | 2/1924 | Davis . |
| 2,471,043 | 5/1949 | Schenck ................................. 241/14 |
| 3,154,255 | 10/1964 | Schulman et al. ....................... 241/14 |
| 3,364,526 | 1/1968 | Varady et al. ............................. 19/82 |
| 3,843,060 | 10/1974 | Colburn ................................. 241/24 |
| 3,923,256 | 12/1975 | Dorner ................................... 241/76 |
| 3,981,455 | 9/1976 | Kaczmarek ............................. 241/32 |
| 4,145,007 | 3/1979 | Jetzer ..................................... 241/24 |
| 4,363,450 | 12/1982 | Schmidt ................................. 241/24 |
| 4,483,488 | 11/1984 | Luff et al. .............................. 241/23 |
| 4,586,208 | 5/1986 | Trevarthen .............................. 8/158 |
| 4,662,569 | 5/1987 | Acker ..................................... 241/62 |
| 4,813,614 | 3/1989 | Moore et al. ........................... 241/23 |
| 4,986,479 | * 1/1991 | Swarden et al. ........................ 241/15 |
| 5,115,983 | * 5/1992 | Rutherford, Sr. ........................ 241/1 |
| 5,230,473 | * 7/1993 | Hagguist et al. ......................... 241/3 |
| 5,234,172 | 8/1993 | Chupka et al. ......................... 241/301 |
| 5,240,530 | 8/1993 | Fink ........................................ 156/94 |
| 5,288,349 | 2/1994 | Fink ........................................ 156/72 |
| 5,316,224 | 5/1994 | Dobozy ................................... 241/30 |
| 5,341,996 | 8/1994 | Rutherford, Sr. ........................ 241/69 |
| 5,404,671 | 4/1995 | Farrow, Jr. et al. .................... 47/1.01 |
| 5,472,763 | 12/1995 | Schwarz et al. ......................... 428/95 |
| 5,482,215 | 1/1996 | Veres .................................. 241/101.4 |
| 5,494,723 | 2/1996 | Erren et al. ............................. 428/95 |
| 5,497,949 | * 3/1996 | Sharer ..................................... 241/76 |
| 5,518,188 | 5/1996 | Sharer ..................................... 241/14 |
| 5,532,035 | 7/1996 | Corbin et al. ........................... 428/95 |
| 5,535,945 | 7/1996 | Sferrazza et al. ....................... 241/24 |
| 5,578,357 | 11/1996 | Fink ........................................ 428/95 |
| 5,598,980 | 2/1997 | Dilly-Louis et al. ................... 241/20 |
| 5,681,952 | 10/1997 | Sifniades et al. ..................... 540/540 |
| 5,704,104 | 1/1998 | Bacon et al. ............................ 28/299 |
| 5,719,198 | 2/1998 | Young et al. ......................... 521/40.5 |
| 5,722,603 | * 3/1998 | Costello et al. ......................... 241/20 |
| 5,728,444 | 3/1998 | Fink ........................................ 428/97 |
| 5,728,741 | 3/1998 | Zegler et al. ............................ 521/40 |
| 5,755,388 | * 5/1998 | Yen et al. ................................ 241/41 |
| 5,763,001 | 6/1998 | Brown .................................. 427/140 |
| 5,772,284 | 6/1998 | Lindsey et al. ...................... 299/36.1 |
| 5,780,696 | 7/1998 | Bauer ................................... 585/241 |
| 5,786,279 | 7/1998 | Funger et al. ......................... 442/659 |
| 5,786,280 | 7/1998 | Funger et al. ........................... 442/64 |
| 5,840,773 | 12/1998 | Booji et al. ............................. 521/49 |
| 5,852,115 | 12/1998 | Young et al. ............................ 525/64 |
| 5,855,981 | 1/1999 | Zegler et al. ............................ 428/95 |

(List continued on next page.)

*Primary Examiner*—John M. Husar
(74) *Attorney, Agent, or Firm*—Kilpatrick Stockton LLP; John S. Pratt; James J. Bindseil

(57) ABSTRACT

A system for reclaiming carpet components such as yarn, tufting primary, binder, and secondary backing wherein the carpet is sprayed with a high velocity water spray so as to disjoint the components from one another, and thereafter, separating the secondary backing from the yarn and tufting primary. Desirably, water is removed from the disjointed carpet after spraying the carpet with high pressure water spray. This system is useful for reclaiming components of broadloom carpet and carpet tiles and cleanly and efficiently separates tie components of carpet.

48 Claims, 4 Drawing Sheets

U.S. PATENT DOCUMENTS

| | | | |
|---|---|---|---|
| 5,859,071 | 1/1999 | Young et al. | 521/40.25 |
| 5,883,020 | 3/1999 | Bargo et al. | 442/168 |
| 5,885,705 | 3/1999 | Kent et al. | 428/168 |
| 5,889,142 | 3/1999 | Mohajer et al. | 528/480 |
| 5,897,006 | 4/1999 | Bacon et al. | 241/160 |
| 5,898,063 | 4/1999 | Stefandl | 528/480 |
| 5,908,164 | 6/1999 | Robinson et al. | 241/19 |
| 5,912,062 | 6/1999 | Kotliar et al. | 428/140 |
| 5,914,353 | 6/1999 | Grizzle et al. | 521/40 |
| 5,916,410 | 6/1999 | Goulet et al. | 156/344 |
| 5,923,724 | 7/1999 | Sifniades et al. | 540/540 |
| 5,929,234 | 8/1999 | Sifniades et al. | 540/540 |
| 5,932,724 | 8/1999 | Sifniades et al. | 540/540 |
| 5,952,660 | 9/1999 | Kip et al. | 250/339.11 |
| 5,977,193 | 11/1999 | Corbin et al. | 521/49.8 |
| 5,985,009 | 11/1999 | Marsala | 96/250 |
| 5,994,417 | 11/1999 | Roberts et al. | 521/49.8 |
| 6,020,486 | 2/2000 | Booji et al. | 540/540 |
| 6,029,916 | 2/2000 | White | 241/24.19 |
| 6,036,726 | 3/2000 | Yang et al. | 8/102 |

\* cited by examiner

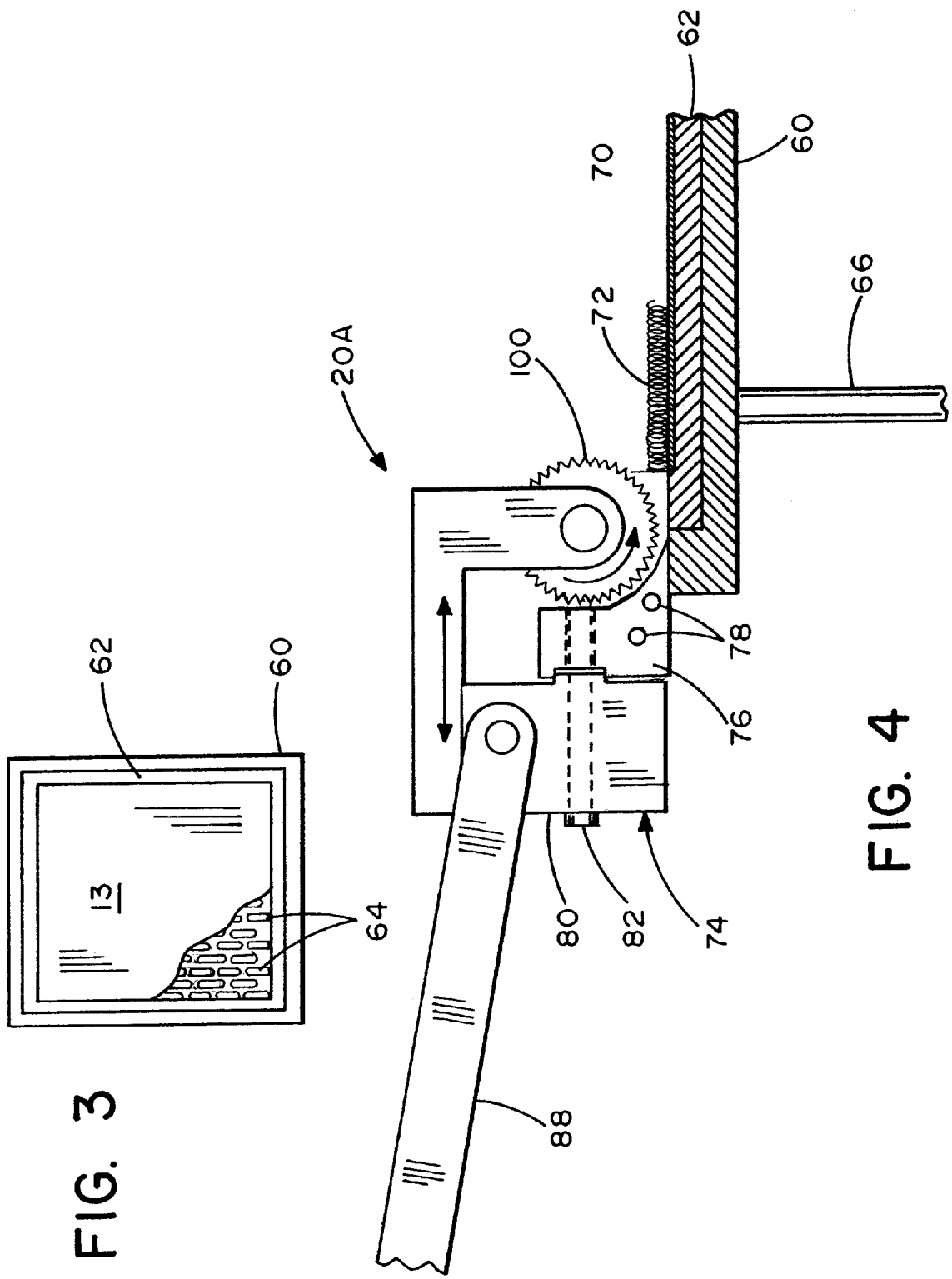

METHOD AND APPARATUS FOR RECLAIMING CARPET COMPONENTS

TECHNICAL FIELD

This application relates to carpet recycling and, in particular, relates to reclaiming carpet components such as yarn, tufting primary and secondary backing for recycling into those same respective components.

BACKGROUND OF THE INVENTION

Tufted carpet is sold in large volumes every year, much of which is sold to replace old carpet. Most components of tufted carpet are not biodegradable and recycling used carpet has long been desirable to avoid disposal of used carpet in land fills and the like. Furthermore, because carpet is a high volume, and often, low margin, product, lowering manufacturing costs is desirable. Carpet recycling however, has often been too complicated and costly and therefore, impractical.

Carpet generally comprises yarn, a tufting primary into which the yarn is tufted, a secondary backing, and a binder, normally latex, which bonds the yarn, tufting primary and secondary backing together. The yarn is typically nylon and can be in the form of cut pile or loop pile. Cut pile carpet is made of short cut lengths of yarn and loop pile carpet is made of long continuous lengths of yarn. The tufting primary is typically a thin sheet of woven polyester or polypropylene material and the secondary backing is usually jute, woven polypropylene, or polyvinylchloride (PVC) sheet.

One known method of recycling includes shredding the entire carpet and either using the shredded carpet for something other than manufacturing carpet or separating the carpet components after shredding such as in a cyclone. Another known method of recycling carpet is to simply shave the yarn off the tufting primary and secondary backing. These known methods, however, are either too complicated and expensive, or are not effective in recycling all the recyclable components of carpet.

U.S. Pat. No. 5,230,473 to Hagguist et al. discloses a system for separating the components of carpet including a combination of mechanical, hydraulic, chemical, and heating means. While this system may effectively separate carpet components, implementing it is very complicated and costly.

Accordingly, there remains a need for a relatively simple and economic system for reclaiming the components of carpet and recycling the reclaimed components back into the same components in newly manufactured carpet.

SUMMARY OF THE INVENTION

This invention satisfies the above-described need by providing a method and apparatus for reclaiming carpet components such as yarn, tufting primary, binder, and secondary backing by spraying the carpet with a high velocity water spray so as to disjoint the binder, yarn, tufting primary and secondary backing from one another, and thereafter, separating the secondary backing from the yarn and tufting primary. By disjointing the carpet components before separating the secondary backing from the yarn and tufting primary, the components of the yarn can be more easily, efficiently, and cleanly separated entirely from one another. The high velocity water spray desirably has a flow rate and velocity sufficient to break up the binder and move the tufting primary from against the secondary backing. The yarn and tufting primary can then be more easily and cleanly separated from the secondary backing.

More particularly, the method and apparatus of this invention removes water from the carpet after the carpet is disjointed with the water spray. Desirably, the system removes water from the carpet before separating the secondary backing from the yarn and tufting primary. Preferably, the method and apparatus of this invention removes water by drying the carpet such as with hot air. Separating and handling the disjointed components of the carpet is easier after drying, than when wet.

The method and apparatus of this invention desirably operate on a continuous basis by continuously conveying carpet to be recycled from a source of carpet through the high velocity water spraying and the water removal, to the separation of the components. The continuous nature of the system of this invention enhances its efficiency.

The method and apparatus of this invention desirably separates the yarn and tufting primary with a knife. More particularly, the method and apparatus of this invention bales the yarn and tufting primary and bales the secondary backing separately. Alternatively, the yarn and tufting primary can be separated and then baled separately.

The water from the water spray breaks up and washes the binder from the carpet. This invention desirably includes collecting this water and separating the binder from the water. The filtered water can be reused in the reclaiming process and the reclaimed binder can be recycled.

The method and apparatus of this invention can be used to reclaim components of both broadloom carpet and carpet tiles. When this invention recycles broadloom carpet, it preferably directs the water spray against the backing side of the carpet. When this invention recycles carpet tiles, it preferably directs the water spray at the yarn side of the carpet tile.

Therefore, an object of this invention is to provide an improved method and apparatus for reclaiming tufted carpet components.

Another object of this invention is to provide a relatively simple and economic method and apparatus for reclaiming the components of tufted carpet so that the reclaimed components can be recycled and used to make the same components in new carpet.

Other objects, features, and advantages of this invention will become apparent from the following specification, drawings and claims.

BRIEF DESCRIPTION OF THE DRAWINGS

FIG. 3 is a partial plan view of a vacuum die and base which form part of the separator section illustrated in FIG. 2.

FIG. 4 is a partial side elevation view of an alternative separator section of the reclaiming system illustrated in FIG. 1.

DETAILED DESCRIPTION

Figure 1:
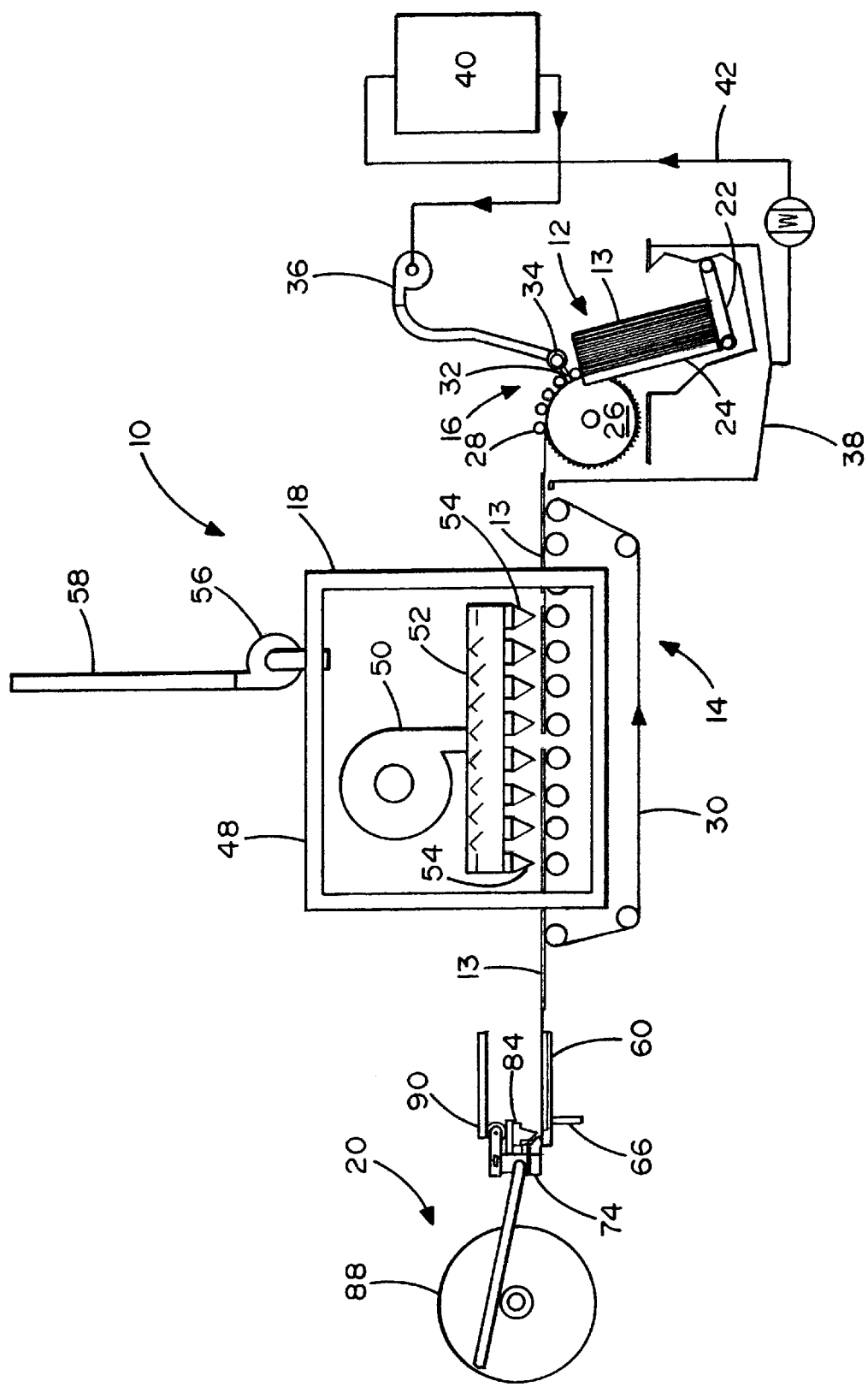
FIG. 1 is a side elevation view of a system made in accordance with an embodiment of this invention for reclaiming components of carpet tiles.

As summarized above, this invention encompasses a method and apparatus for reclaiming components of a tufted carpet. Embodiments of this invention are described below. First, an embodiment of the invention for reclaiming components of tufted carpet tiles is described, followed by another embodiment that is suitable for reclaiming components of tufted broadloom carpet. In the drawings, like reference numerals indicate like parts throughout the views.

This invention allows reclaiming of each component of carpet including yarn, tufting primary, secondary backing, and binders such as latex. These materials are reclaimed such that they can be reused as the same respective components. For example, the reclaimed yarn can be recycled as yarn, the reclaimed tufting primary can be recycled as tufting primary, and the secondary backing can be recycled as secondary backing. The binder, which is normally a latex, can be reclaimed and recycled, for example, as a filler for latex to be used to make new carpet.

FIG. 1 illustrates a system 10 for reclaiming carpet tile components comprising a feeder 12 for continuously feeding carpet tiles 13, a conveyor system 14 for conveying the carpet tiles through the system, a water sprayer system 16, a dryer 18 for drying the carpet tiles after the carpet tiles have passed through the water sprayer system and a separator 20 for separating components of the carpet tile after drying.

The feeder 12 includes a belt-driven carpet tile stack support 22 and an inclined support 24. The carpet tiles 13 are stacked vertically on top of the belt-driven stack support 22 and lean against the upright support 24. The feeder 12 is positioned adjacent to the conveyor system 14 and feeds the carpet tiles 13 to the conveyor system.

The conveyor system 14 includes a driven steel roll 26, with embedded sharp pins extended outwardly from the outer surface of the roll, and a plurality of driven elastomer-coated rollers 28 positioned adjacent the driven steel roll. The elastomer-coated rollers 28 are spaced from one another and extend transversely across the steel roll 26 to form a series of nips through which the carpet tiles 13 are drawn between the driven steel roll and the driven elastomer-covered rollers. The conveyor system 14 also includes a belted conveyor 30 positioned adjacent the driven steel roll 26 and arranged to carry the carpet tiles 13 from the driven steel roll through the dryer 18.

The water sprayer system 16 includes an array of high pressure nozzles 32 positioned adjacent the driven steel roll 26 and extending transversely across the steel roll approximate the stack of carpet tiles 13 in the feeder 12. The high pressure nozzles 32 are mounted to a high pressure water manifold 34 and water is fed through the manifold to the array of high pressure nozzles 32 by a high pressure water pump 36. Although FIG. 1 shows only one row of high pressure nozzles 32, it should be understood that the reclaiming system 10 can include multiple rows of nozzles.

The high pressure nozzles 32 are positioned so that the outlets of the nozzles are very close to the carpet tiles as the carpet tiles are drawn between the driven steel roll 26 and the driven elastomer covered rollers 28. Desirably, the nozzles are almost touching the yarn side of the tiles as the tiles pass by the nozzles. The nozzles desirably spray water at a pressure from about 2000 to about 4000 psi when treating carpet tiles. The water sprays desirably remove substantially all of the binder from the carpet tiles such that the yarn is connected to the secondary backing only by a few remaining filaments.

The sprayer system 16 also includes a water and debris catch pan 38 positioned below the feeder 12, the driven steel roll 26 of the conveyor system 14, and the high pressure nozzles 32 to catch water that passes through the carpet and flows downwardly and latex binder particles dislodged and washed away by the water. The water and latex binder caught by the catch pan 38 is fed to a filter press 40 through a conduit 42. The filter press 40 removes the solid latex binder from the water and the filtered water is reused in the reclaiming system 10. The high-pressure water pump 36 draws the filtered water from the filter press and additional water is added because not all water is reclaimed and recycled in the system.

The dryer 18 is desirably a hot air dryer and is illustrated in FIG. 1 with the side panels removed. The hot air dryer 18 includes a hood 48 positioned about the belted conveyor 30, a fan 50 for blowing the hot air against the carpet tiles 13 as they are carried by the conveyor, a heat source 52 for heating the air in the hood, and hot air distribution nozzles 54 for directing the hot air against the carpet tiles. An exhaust fan 56 draws moisture laden air from the hood 48 and out of the hood through an air discharge 58. Although the dryer 18 is illustrated in FIG. 1 as a hot air dryer, other types of dryers can be used in the system 10 such as a vacuum dryer, squeeze rollers, and the like.

Figure 2:
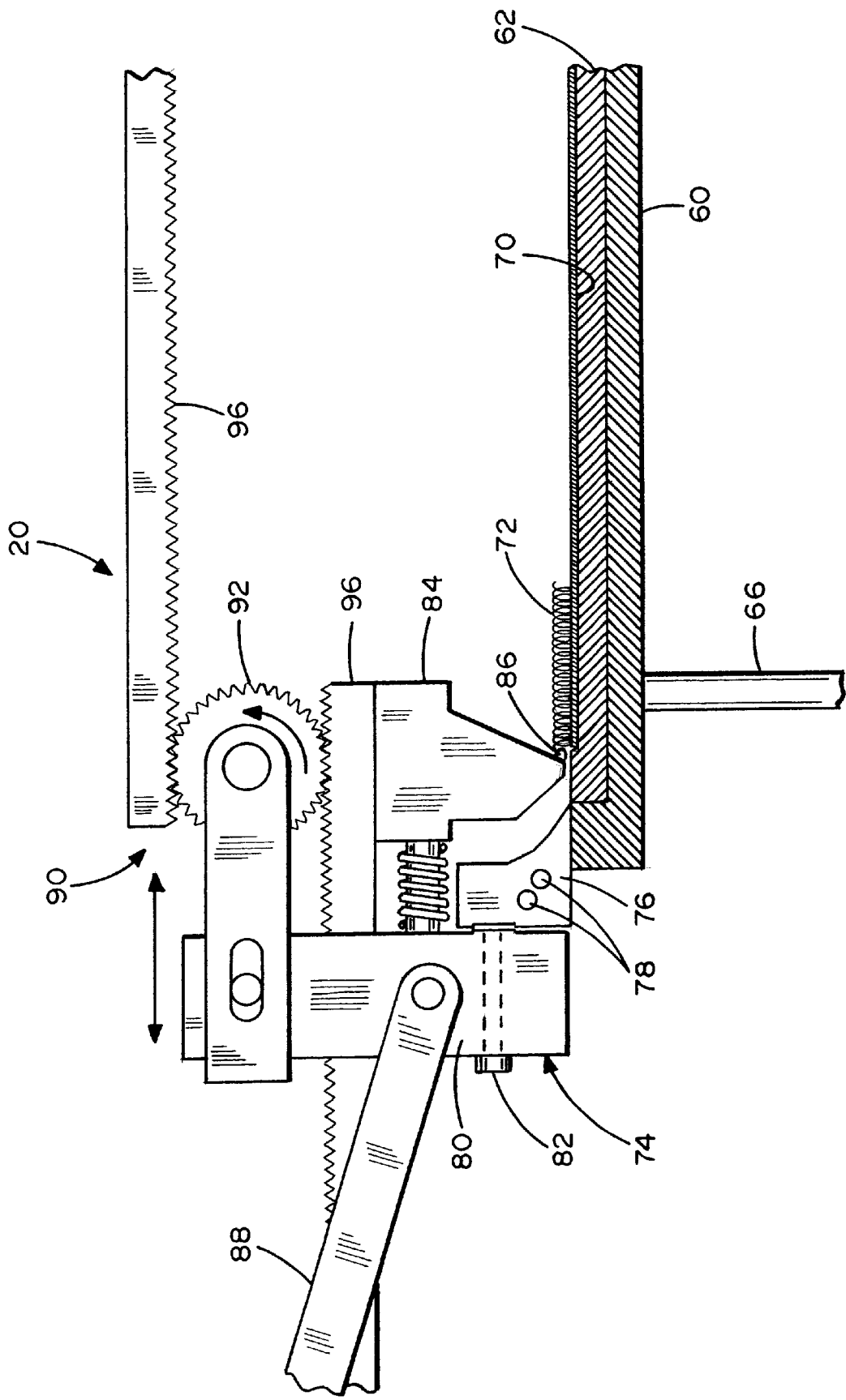
FIG. 2 is a partial side elevation view of the separator section of the reclaiming system illustrated in FIG. 1.

The separator 20 receives dried, disjointed carpet tiles from the belted conveyor 30 and separates any remaining filaments from the secondary backing. The separator 20 includes a square base tray 60 and a vacuum die 62 disposed in the tray for receiving, successively, each of the carpet tiles 13. The vacuum die 62 is better illustrated in FIGS. 2 and 3 and includes a plurality of holes 64. A vacuum tube 66 is connected to the bottom of the tray 60 and a vacuum generator (not shown) draws a vacuum through the vacuum tube 66 and the holes 64 in the vacuum die 62 to hold the carpet tiles in the vacuum die. The carpet tiles 13 are fed into the separator with the secondary backing 70 facing downwardly and the yarn and tufting primary 72 facing upwardly.

The separator 20 includes a mechanical separator assembly 74 including a hot knife 76 heated by a plurality of cartridge heaters 78. The hot knife 76 is carried on a carriage 80 and mounted thereto with bolts 82. A pin bar 84 is also mounted to the carriage 80 and holds a plurality of pins 86 for engaging the yarn of the carpet tiles in the separator 20.

The cutting assembly 74 includes an oscillation actuator 88 which pushes and pulls the carriage 80 so that the carriage can reciprocate back and forth across the carpet tiles 13.

The cutting assembly 74 also includes a gear assembly 90 including a gear wheel 92, a fixed rack gear 94 and an oscillating rack gear 96 arranged to drive the hot knife 76 and pin bar 84 back and forth along the carpet tiles 13. Although an oscillation actuator 88 is illustrated in FIG. 1, other types of reciprocating devices can be used such as a hydraulic or pneumatic cylinder. In addition, although FIG. 1 illustrates a hot knife, the knife does not have to be heated and other suitable types of cutting or pulling devices for severing the remaining filaments from the secondary backing can be used.

Operation of the system 10 for reclaiming carpet tile components begins with loading the feeder 12 with carpet tiles 13. The feeder 12 feeds carpet tiles 13 one by one to the belted conveyor 30 with the driven steel roll 26 and the driven elastomer covered rollers 28.

The high-pressure nozzles 32 deliver high pressure water sprays against the yarn side of the carpet tiles 13 as the conveyor system 14 draws the carpet tiles. The nozzles 32 deliver the water sprays such that the water sprays pass through the yarn and the tufting primary and disjoint substantially all of the latex binder from the yarn, the tufting primary, and the secondary backing. The secondary backing of the carpet tiles is normally a sheet of PVC and acts as a blasting pad for the water. The water passes through the tufting primary and then pushes the tufting primary away from the secondary backing along the fibers of the yarn. The water spray washes the surfactant out of the latex binder so that the latex becomes brittle, shatters and washes away into the catch pan 38. The water spray is desirably delivered at a water pressure sufficient to disjoint the components of the carpet tiles 13 but not sufficient to penetrate or otherwise damage the PVC secondary backing material. Therefore, the high pressure water sprays are desirably delivered at a pressure from about 2000 to about 4000 psi. Normally, a very small portion of the latex binder remains attached to the yarn after the application of the water spray and some filaments of the yarn remain attached to the secondary backing.

Carpet tiles are typically a loop pile carpet, which is preferred for use in this system 10 for reclaiming carpet tile components. Although cut pile carpet tiles can be reclaimed with this system, the short discontinuous fibers in cut pile yarn tend to completely separate from the other components of the carpet tile immediately when the carpet tiles are sprayed and are difficult to collect. With loop pile carpet tiles, the yarn, though disjointed after application of the water spray, does not completely separate from the rest of the carpet tile components, except for the latex binder, until the separator 20. This allows for more efficient and clean separation of the carpet tile components.

The driven steel roll 26 and driven elastomer covered rollers 28 feed the disjointed carpet tiles 13 to the belted conveyor 30 which carries the wet disjointed carpet tiles through the dryer 18. The dryer 18 removes the water from the carpet tiles 13 and desirably dries the yarn completely. The dryer 18 turns any latex binder remaining in the carpet tiles into powder and increases the bulk or fluffs the yarn so that separation of the yarn from the secondary backing is easier. The dryer 18 should be at a temperature sufficient to dry the carpet tiles, but not melt any components of the carpet tiles. Therefore, the temperature of the dryer should be less than about 350° F., and desirably from about 250° to about 300° F.

The belted conveyor 30 delivers the dried carpet tiles 13 to the separator 20 and specifically into the vacuum die 62. While the disjointed, dried carpet tiles 13 are held in the vacuum die 62, the oscillation actuator 88 pushes the hot knife 76 and pin bar 84 of the separator across the carpet tile and separates the remaining filaments from the secondary backing. The pins 86 on the pin bar 84 of the separator 20 snag the yarn of the carpet tiles 13 and pull the yarn away from the secondary backing 70 while the hot knife 76 cuts any of the yarn filaments still adhered to the secondary backing.

The yarn and tufting primary 72 are taken together from the separator and can be baled for later separation and recycling or can be immediately separated and then baled individually for subsequent recycling. The yarn and tufting primary can be separated by a device such as a carding machine or by hand. The yarn and tufting primary can be chopped, melted, and re-extruded as new yarn and tufting primary respectfully. Alternatively, the yarn can be chopped to make spun yarn from staple fibers.

The PVC backing of the carpet tiles is removed from the separator and is ready for recycling such as by chopping, melting, and re-extruding the material into new PVC backings.

FIG. 4 illustrates an alternative separator 20A that includes a driven serrated steel wheel 100 instead of the pin bar 84 and pins 86 in the embodiment illustrated in FIG. 1. The serrated steel wheel 100 pulls the yarn of the carpet tiles while the hot knife 76 cuts the remaining filaments.

Figure 5:
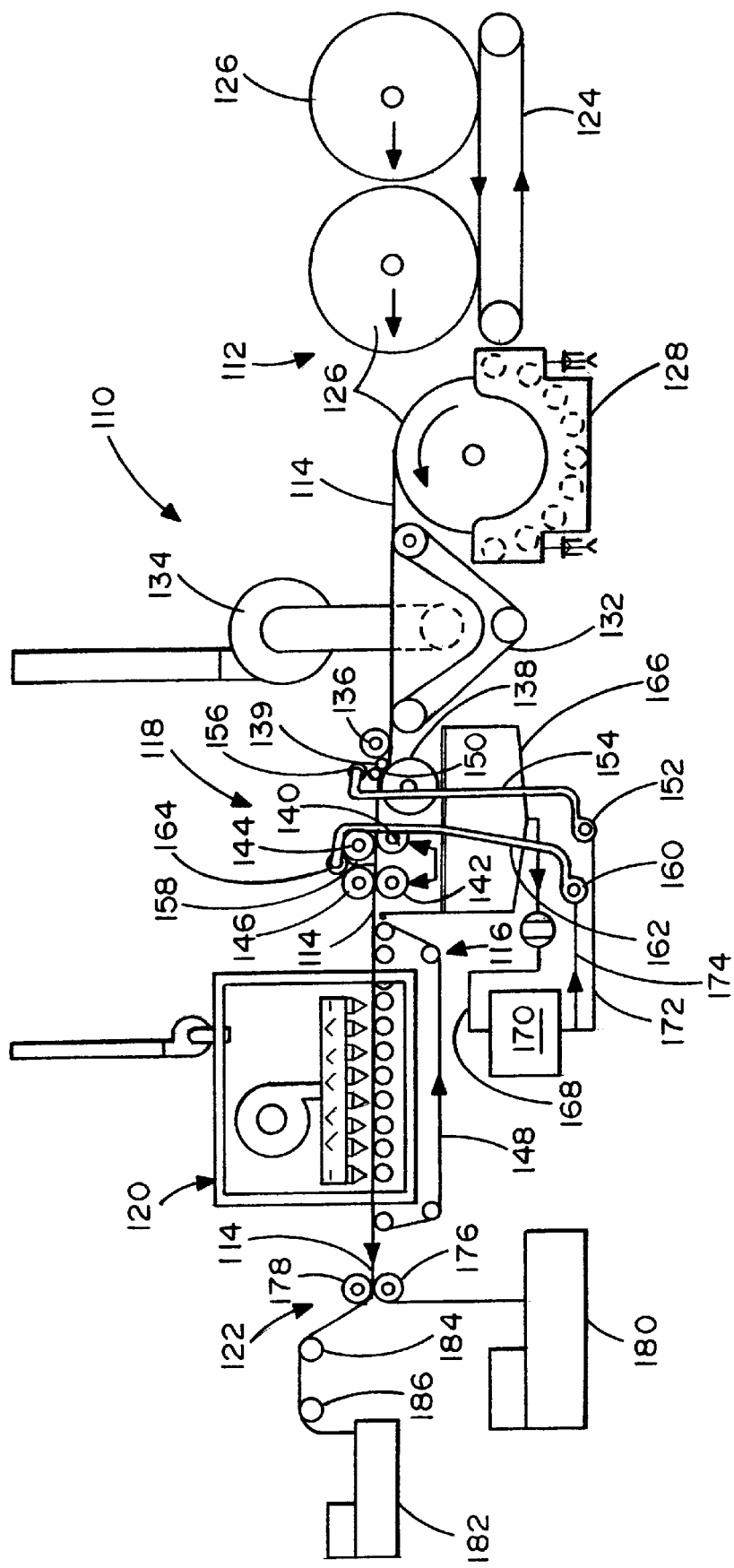
FIG. 5 is a side elevation view of a system made in accordance with an embodiment of this invention for reclaiming components of broadloom carpet.

FIG. 5 illustrates a system 110 for reclaiming broad loom carpet components generally comprising a feeder system 112 for feeding broad loom carpet 114, a conveyor 116 for carrying the broad loom carpet from the feeder system 112 through the re-claiming system, a water sprayer system 118 for disjointing the carpet components, a dryer 120 for drying the sprayed carpet, and a separator 122 for separating the broad loom carpet components.

The feeder system 112 includes a driven and belted carpet roll staging table 124 for feeding carpet rolls 126 into the reclaiming system 110. The staging table 124 feeds carpet rolls 126 to a guided unroll unit 128 which rotates the carpet roll and actually feeds the broadloom carpet 114 toward a driven belted vacuum table 132. A vacuum blower fan 124 creates a vacuum beneath the vacuum table 132 and holds the carpet against the vacuum table. An operator can splice carpet rolls together as the carpet ends pass over the vacuum table 132.

The conveyor 116 receives the broadloom carpet from the vacuum table 132. The carpet 114 passes from the vacuum table 132 underneath a guide roll 136 and between a driven steel roll 138 and a pair of driven elastomer covered rolls 139. The broadloom carpet 114 then passes between two pairs of rolls 140, 142, 144 and 146. The lower rolls in the pairs are driven steel rolls 140 and 142 and the upper rolls are floating steel rolls 144 and 146. The broadloom carpet passes next to a driven belted conveyor 148 that carries the carpet through the dryer 120 and feeds the carpet to the separator 122.

The water sprayer system 118 includes a first array of high pressure nozzles 150 positioned above the first driven steel roll 138 of the conveyor 116 and extends transversely across the driven steel roll. The first array of high-pressure nozzles 150 is positioned to spray the broadloom carpet 114 as the carpet passes over the driven steel roll 138. The first array of nozzles 150 are positioned so that the spray openings are very close to the carpet 114 and almost touch the carpet. A high pressure pump 152 supplies water at high pressure through a conduit 154 and a manifold 156 to the first array of nozzles 150.

The water sprayer system 118 also includes a second array of high-pressure nozzles 158 positioned between the pairs of driven and floating steel rolls 140, 142, 144 and 146. The second array of nozzles 158 extends transversely across the broadloom carpet and is likewise positioned very close to the broadloom carpet 114 as the broadloom carpet passes. A high-pressure pump 160 delivers water at high pressure through a conduit 162 and a manifold 164 to the second array of nozzles 158.

The water sprayer system 118 further comprises a water and debris catch pan 166 disposed beneath the first and second nozzles arrays 150 and 158 and catches water that flows through the broadloom carpet 114 and latex particles dislodged from the broadloom carpet and washed out of the carpet. The water and latex particles from the catch pan 166 are drawn from the catch pan 166 through a conduit 168 to a filter 170 which filters the latex particles out of the water. Water is returned to the nozzle arrays 150 and 152 by pumps 152 and 160 through lines 172 and 174. Additional water is added to the system to make up for water lost during treatment of the carpet.

The driven belted conveyor 148 receives the broadloom carpet after the carpet is sprayed with water and carries the carpet through the dryer 120 which has the same structure as the dryer 18 illustrated in FIG. 1.

After the carpet 114 is dried, the carpet passes through a pair of driven steel pin rollers 176 and 178 which separate the yarn and tufting primary from the secondary backing. A cutting instrument (not shown) such as a knife can be used to complete separation of the remaining yarn filaments from the secondary backing. This separator 122 also includes a baler 180 for baling the yarn and tufting primary and a baler 182 for baling the secondary backing. Guide rolls 184 and 186 guide the separated secondary backing to the backing material baler 182.

During operation of the reclaiming system 110 for broadloom carpet, the unroll unit 128 feeds the broadloom carpet across the vacuum table 132 beneath the first guide roll 136 of the conveyor 116 and through the nips between the driven steel roll 138 of the conveyor and the pair of driven elastomer covered rolls 139.

The first array of high pressure nozzles 150 sprays water at high pressure against the secondary backing side of the broadloom carpet 114. The broadloom carpet 114 is directed through the reclaiming system 110 such that the yarn side of the broadloom carpet faces downwardly and the backing side faces upwardly. This is because the secondary backing of broadloom carpet is normally a foraminous material such as woven polypropylene or jute and the high pressure water spray is sprayed through the secondary backing. The high pressure water spray from the first array of nozzles 150 is applied to the broadloom carpet 114 at a pressure sufficient to disjoint substantially all of the binder, which is normally latex, from the secondary backing, the yarn and the tufting primary. The pressure of the water spray is preferably at least about 2000 psi and can be much higher. The water spray disjoints the tufting primary and pushes the tufting primary along the yarn away from the secondary backing. The yarn remains attached to the secondary backing by only a few filaments.

The second array of nozzles 158 operates in the same manner as a first array of nozzles 150 and further disjoints the components of the broadloom carpet 114 from one another. The disjointed latex binder is substantially completely washed by the water spray from the broadloom carpet into the catch pan 166 in the same manner as in the first embodiment 10 described above.

The disjointed carpet 114 is then dried in the dryer 120 and passed into the separator 122 wherein the tufting primary and yarn are separated from the secondary backing and baled as described above. Alternatively, the tufting primary and yarn can be separated and separately baled before recycling.

Alternatively, the second backing of the broadloom carpet 114 can be removed from the yarn and tufting primary as the broadloom carpet passes between the first and second array of nozzles 150 and 158. This avoids having to dry the secondary backing and allows more of the latex binder to be removed from the yarn by the water spray from the second array of nozzles 158. In addition, removing the yarn from the secondary backing before the second array of nozzles 158 makes the second array of nozzles more effective in removing any remaining latex from the yarn because the secondary backing does not interfere with the water spray.

The reclaimed tufting primary and yarn are recycled in the same manner as described above with regard to the first embodiment.

It should be understood that the foregoing relates to particular embodiments of the present invention, and that numerous changes may be made therein without departing from the scope of the invention as defined by the following claims.

What is claimed is:

1. A method for reclaiming carpet components wherein the carpet comprises yarn, tufting primary, binder, and secondary backing, the method comprising the steps of:

spraying the carpet with a high velocity water spray so as to remove substantially all of the binder and disjoint the binder, yarn, tufting primary, and secondary backing from one another, and thereafter;

removing water from the disjointed carpet; and separating the secondary backing from the yarn and tufting primary.

2. A method as in claim 1, wherein the step of removing water is carried out before separating the secondary backing from the yarn and tufting primary.

3. A method as in claim 1, wherein the step of removing water comprises removing water from the yarn after spraying the carpet and separating the secondary backing from the yarn and tufting primary.

4. A method as in claim 1, wherein the step of removing water comprises drying the disjointed carpet.

5. A method as in claim 4, wherein the disjointed carpet is dried with hot air.

6. A method as in claim 5, wherein drying the disjointed carpet with hot air further comprises hot air having a predetermined temperature to dry but not melt the carpet components.

7. A method as in claim 6, wherein the predetermined temperature is in the range of about 250 to about 350 degrees Fahrenheit.

8. A method as in claim 4, wherein the disjointed carpet is dried with a vacuum dryer.

9. A method as in claim 4, wherein the disjointed carpet is dried with squeeze rollers.

10. A method as in claim 1, further comprising continuously conveying the carpet from a source of carpet through the step of spraying and to the step of separating.

11. A method as in claim 1, wherein the carpet is a carpet tile and has a yarn side and a backing side, and the water spray is directed at the yarn side.

12. A method as in claim 1, wherein the carpet is broadloom carpet and has a yarn side and a backing side, and the water spray is directed at the backing side.

13. A method as in claim 1, wherein the carpet is loop carpet.

14. A method as in claim 1, wherein the separation step is carried out with a knife.

15. A method as in claim 14, wherein the separation step further comprises pulling the yarn and tufting primary away from the secondary backing as the hot knife separates the yarn from the secondary backing.

16. A method as in claim 1, further comprising the step of baling the yarn and tufting primary after the separation step.

17. A method as in claim 16, further comprising the step of baling the secondary backing after the separation step.

18. A method as in claim 1, further comprising the step of separating the yarn from the tufting primary.

19. A method as in claim 1, wherein the disjointing of the binder, yarn, tufting primary, and secondary backing from one another further comprises the water pushing the tufting primary away from the secondary backing along fibers of the yarn, and wherein the water spray washes a surfactant out of the binder so that the binder becomes brittle, shatters into particles and washes away.

20. A method as in claim 19, further comprising:

collecting the sprayed water and binder particles;

removing the binder particles from the collected water; and reusing the water in the spraying step.

21. A method as in claim 19, wherein the step of spraying the carpet with a high velocity water spray comprises delivering the water such that the water first passes through the yarn and then through the tufting primary.

22. A method as in claim 19, wherein the step of spraying the carpet with a high velocity water spray comprises delivering the water such that the water first passes through the secondary backing.

23. A method as in claim 1, wherein the step of spraying the carpet with a high velocity water spray comprises delivering the water at a predetermined pressure sufficient to disjoint the carpet components without damaging the secondary backing.

24. A method as in claim 23, wherein the predetermined pressure is at least about 2000 pounds per square inch.

25. A method as in claim 23, wherein the predetermined pressure is in the range of about 2000 to about 4000 pounds per square inch.

26. A method as in claim 1, wherein the separating step further comprises oscillating a knife across the carpet to cut any remaining filaments of yarn from the secondary backing.

27. A system for reclaiming carpet components wherein the carpet comprises yarn, tufting primary, latex binder, and secondary backing, the system comprising:

a high velocity water sprayer for spraying the carpet so as to remove substantially all of the binder and disjoint the latex binder, yarn, tufting primary, and secondary backing from one another;

a dryer for removing water from the disjointed carpet; and a separator for separating the secondary backing from the yarn and tufting primary after spraying the carpet.

28. A system as in claim 27, wherein the dryer is positioned between the water sprayer and separator.

29. A system as in claim 27, wherein the dryer is a hot air dryer.

30. A system as in claim 29, wherein the hot air dryer delivers hot air having a predetermined temperature to dry but not melt the carpet components.

31. A system as in claim 30, wherein the predetermined temperature is in the range of about 250 to about 350 degree Fahrenheit.

32. A system as in claim 27, further comprising a conveyor for continuously conveying the carpet from a source of carpet through the sprayer and to the separator.

33. A system as in claim 27, further comprising a conveyor for continuously conveying the carpet from a source of carpet, through the sprayer and dryer, to the separator.

34. A system as in claim 27, wherein the carpet is a carpet tile and has a yarn side and a backing side, and the water sprayer is positioned to direct the water spray at the yarn side.

35. A system as in claim 27, wherein the carpet is broadloom carpet and has a yarn side and a backing side, and the water spray is positioned to direct the water spray at the backing side.

36. A system as in claim 27, wherein the separator includes a hot knife.

37. A system as in claim 36, wherein the separator further comprises means for pulling the yarn and tufting primary away from the secondary backing as the hot knife separates the yarn from the secondary backing.

38. A system as in claim 27, further comprising a first baler for baling the yarn and tufting primary after separation from the secondary backing.

39. A system as in claim 38, further comprising a baler for baling the secondary backing after separation from the yarn and tufting primary.

40. A system as in claim 27, further comprising a water recycling system connected to the water sprayer, the water recycling system having a collector and a filter, the collector for recovering the sprayed water and disjointed binder particles, and the filter for removing the binder particles from the collected water prior to reuse by the water sprayer.

41. A system as in claim 27, wherein the high velocity water sprayer delivers the water such that the water first passes through the yarn and then through the tufting primary.

42. A system as in claim 27, wherein the high velocity water sprayer delivers the water such that the water first passes through the secondary backing.

43. A system as in claim 27, wherein the high velocity water sprayer delivers the water at a predetermined pressure sufficient to disjoint the carpet components without damaging the secondary backing.

44. A system as in claim 43, wherein the predetermined pressure is at least about 2000 pounds per square inch.

45. A system as in claim 43, wherein the predetermined pressure is in the range of about 2000 to about 4000 pounds per square inch.

46. A system as in claim 27, wherein the dryer comprises a vacuum dryer.

47. A system as in claim 27, wherein the dryer comprises squeeze rollers.

48. A system as in claim 27, wherein the separator further comprises a knife attached to an oscillating mechanism, such that the knife oscillates across the carpet to cut any remaining filaments of yarn from the secondary backing.

* * * * *

UNITED STATES PATENT AND TRADEMARK OFFICE
CERTIFICATE OF CORRECTION

PATENT NO.  : 6,182,913 B1
DATED       : February 6, 2001
INVENTOR(S) : Michael A. Howe, Samuel H. White, Samuel G. Locklear It is certified that error appears in the above-identified patent and that said Letters Patent is hereby corrected as shown below:

Column 1,
Line 22, "yam" should be -- yarn --

Column 6,
Line 17, "124" should be -- 134 --

Column 9,
Line 46, "degree" should be -- degrees --

Signed and Sealed this

Thirtieth Day of October, 2001

Attest:

NICHOLAS P. GODICI
Attesting Officer    Acting Director of the United States Patent and Trademark Office